Oct. 28, 1952 R. P. ABBENHOUSE 2,615,979

COMPOSITE SYNC DISSECTOR

Filed July 7, 1948 3 Sheets-Sheet 1

INVENTOR
RALPH P. ABBENHOUSE
BY Darby & Darby
ATTORNEYS

INVENTOR.
RALPH P. ABBENHOUSE
BY
Darby & Darby
ATTORNEYS

Oct. 28, 1952 R. P. ABBENHOUSE 2,615,979

COMPOSITE SYNC DISSECTOR

Filed July 7, 1948 3 Sheets-Sheet 3

*INVENTOR.*
RALPH P. ABBENHOUSE
*BY*
Darby & Darby
ATTORNEYS

Patented Oct. 28, 1952 2,615,979

UNITED STATES PATENT OFFICE 2,615,979

COMPOSITE SYNC DISSECTOR

Ralph P. Abbenhouse, East Paterson, N. J., assignor to Allen B. Du Mont Laboratories, Inc., Passaic, N. J., a corporation of Delaware Application July 7, 1948, Serial No. 37,342

5 Claims. (Cl. 178—7.5)

This invention relates to electronic equipment involving pulse signals and particularly to television systems utilizing synchronizing pulses as part of the signal.

In the operation of television transmitter equipment, it is particularly important that the wave form of the composite television signal be maintained in accordance with standards established by the Federal Communications Commission. It has been customary to incorporate a cathode ray tube with the rest of the equipment at the transmitter so arranged as to permit observation of the composite wave form. Horizontal deflecting signals of sawtooth shape and proper frequency provide the time-base and the composite video signals are applied to the vertical deflecting plates. The horizontal deflecting signals are synchronized at either the frame repetition rate or the line repetition rate. This enables observation of either one complete frame of the composite signal or all of the horizontal line intervals superimposed on one another, but it does not provide for selection of a particular field (odd or even) or of any particular line of a composite signal of an interlaced picture.

The object of this invention is to provide means for selecting any particular horizontal line synchronizing pulse in either of the interlaced fields of the standard television composite synchronizing wave form, which then may be used to trigger a sweep circuit for a cathode ray oscillograph, to enable observation of that line.

By the present invention, means are provided to select any line of either field of the composite television signal for portrayal on the screen of the cathode ray tube.

The invention may be understood from the description in connection with the accompanying drawings, in which.

Figure 3A:
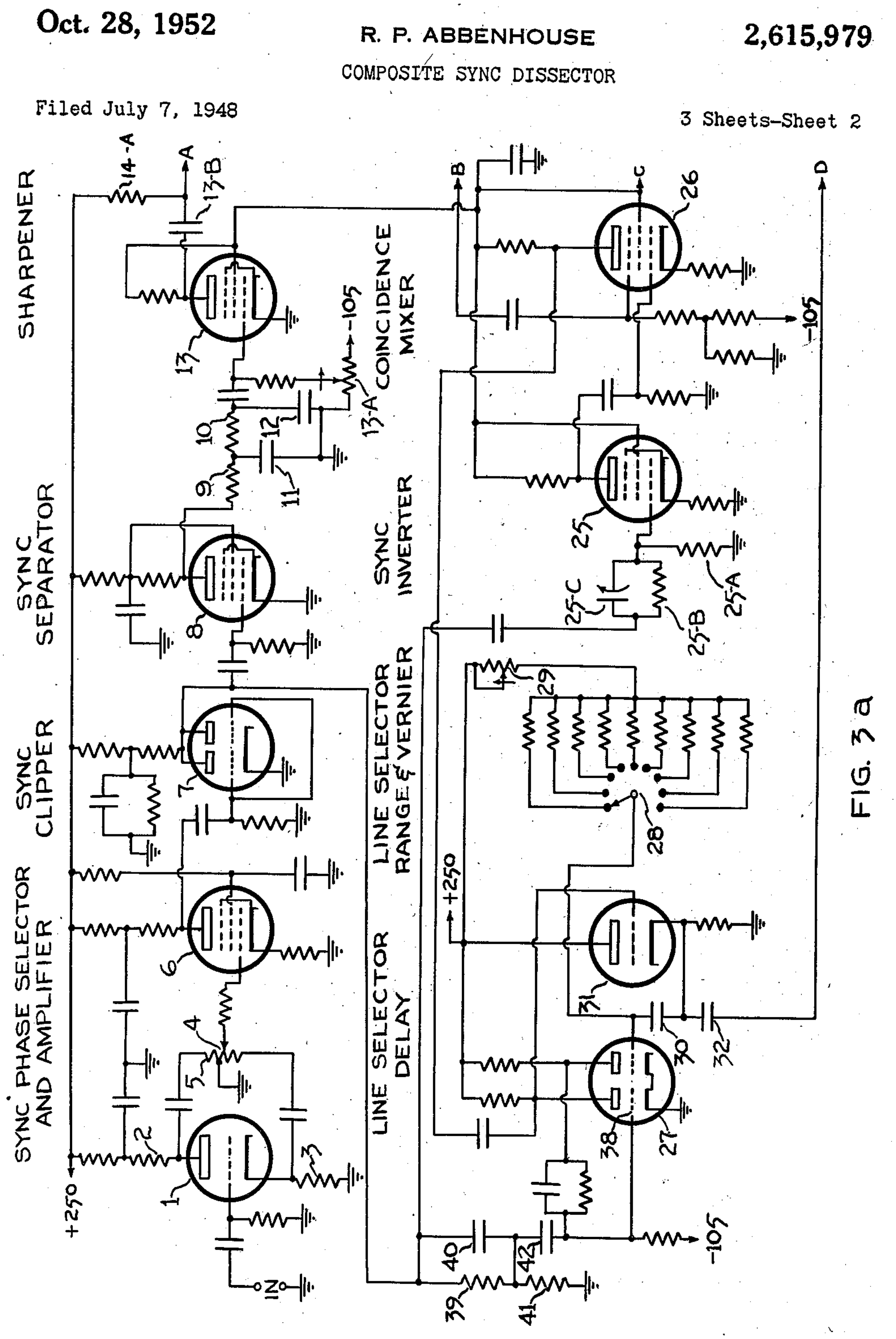
Figure 3B:
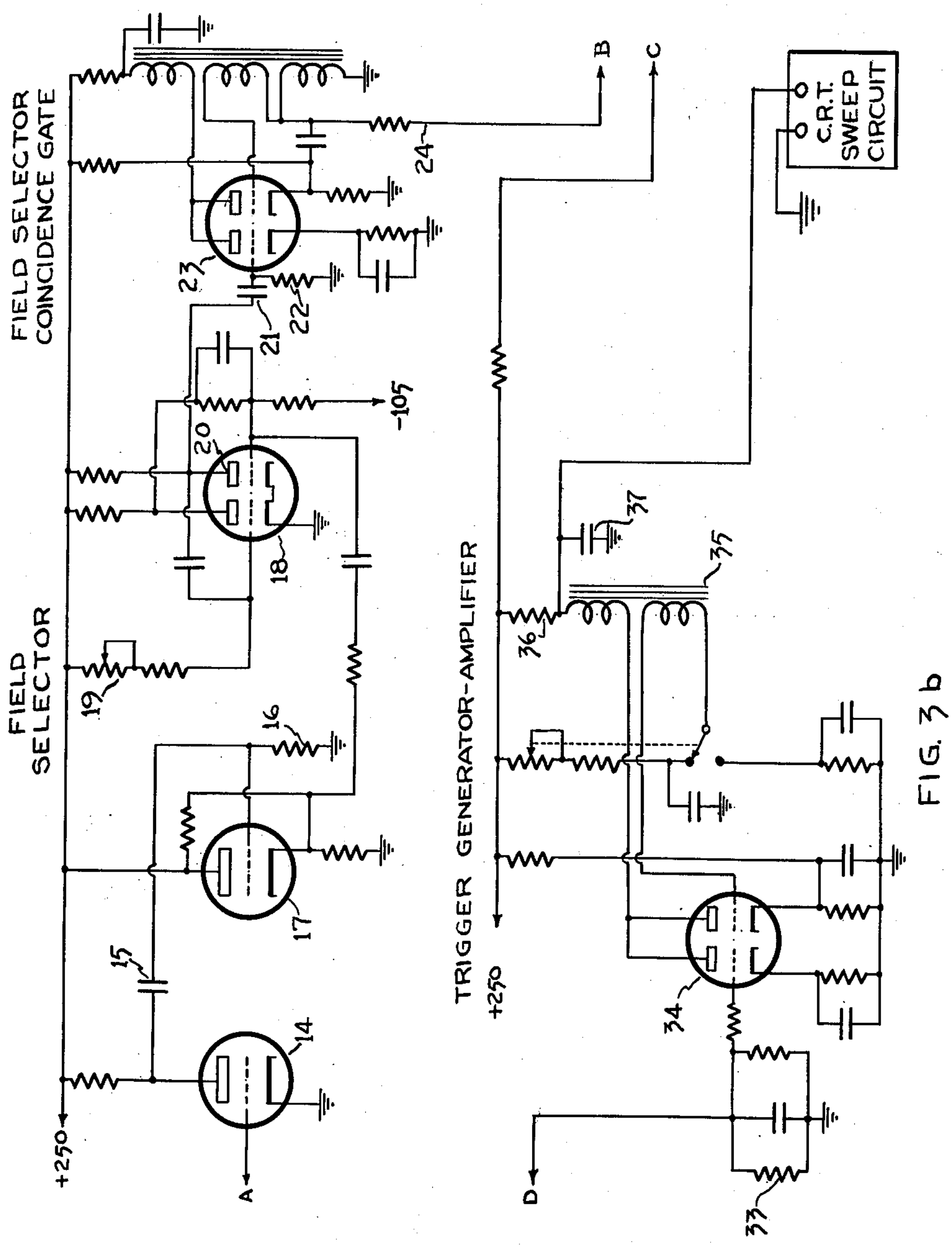

Figs. 3*a* and 3*b* show diagrammatically the circuit used in an embodiment of the device.

This invention utilizes in combination a number of individual circuits each in itself well known and understood by those skilled in the art. The functional operation in accordance with this invention is a result of the combination of circuits and it will be recognized that various individual circuits may be substituted according to preference.

Referring now in more detail to Fig. 3*a*, it may be seen that there is provided a triode amplifier tube 1 connected to a source of synchronizing signals utilized in television signal transmission. Triode tube 1 is plate loaded by a resistor 2 and cathode loaded by a resistor 3. A potentiometer type resistor 5 is connected across the anode and cathode of the tube 1 through suitable capacitors. Resistor 5 is center tapped to ground. The sliding contact 4 of resistor 5 is connected to the input of an amplifier tube 6 so that the polarity as well as the magnitude of the output signal from the tube 1 may be varied in accordance with the relative position of the contact 4 with respect to the center tap of the resistor.

The tube 6 will be recognized as an amplifier tube having the output thereof connected to a triode tube 7 having circuit connections for operation as a clipper. Tube 7 may be a dual or twin triode as illustrated. However, this is not essential. It will be apparent that any triode may be used with circuits connected so that the tube operates as a clipper in the well known manner. The output of the clipper tube 7 is connected to an amplifier tube 8 which has in its output circuit resistors 9 and 10 having capacitors 11 and 12 connected to ground to form an integrating circuit.

The integrated vertical synchronizing signal is then positive in polarity and of sufficient amplitude to exceed the plate current cut off bias voltage of tube 13. Variable resistor 13A is adjusted so that tube 13 is cut off thereby allowing the above mentioned integrated vertical synchronizing signal to drive the grid from cut off to zero bias. A slight amount of clipping occurs in this grid circuit and is desirable to insure plate current saturation and to reduce the effects of amplitude variations of the applied signal which often occur. Plate current saturation thus occurs at the leading edge of the applied signal thereby introducing large distortion or, what is more important, a sharp decrease in leading edge rise time. The output from tube 13 is connected through the line identified by A in Figs. 3*a* and 3*b* to tube 14 in Fig. 3*b*.

Tube 14 carries this process further and also inverts the signal for proper application to the differentiating circuit composed of condenser 15 and resistor 16. In this case the grid of tube 14 is held at zero bias by grid current resulting from the connection of resistor 14A to the plate supply voltage. The signal of negative polarity appearing at the plate of tube 13 is then applied through the coupling condenser 13B driving the grid of tube 14 quickly to plate current cut off, further decreasing leading edge rise time. The differentiating process performed by condenser 15 and resistor 16 results in a positive pulse corresponding to the leading edge and a negative pulse corresponding to the trailing edge of the signal at the plate of tube 14. This positive pulse also corresponds approximately to the beginning of the serrated vertical synchronizing signal, namely, $t_1$ or $(t_1+V)$ of Fig. 1 appearing at the grid of tube 8.

The output of tube 14 is connected to a triode tube 17 through capacitor 15 and across resistor 16 which together form a differentiating circuit. Tube 17 will be recognized as a cathode follower triode tube which passes only the positive going portion of the differentiated pulses applied thereto, to a multivibrator type circuit. In the particular form shown the multivibrator circuit comprises a twin triode tube 18 having a variable resistor 19 connected to operate in a way well understood by those skilled in the art so that the duration of the square wave pulse output of the multivibrator circuit may be varied. The square wave pulse output on the multivibrator tube 18 is applied across a differentiating circuit formed by capacitors 21 and resistor 22. Thus, the positive going portion of the pulse output from the differentiating circuit may be varied in time by the variable resistor 19. This positive going pulse is applied to a twin triode 23 connected as a blocking oscillator. The blocking oscillator tube 23 is triggered by the pulse from the differentiating circuit and in this way the time at which the blocking oscillator is triggered is varied by the variable resistor 19.

The pulse output from the blocking oscillator 23 is applied through line 24 of Fig. 3*b* to a suppressor grid of tube 26 in Fig. 3*a* through the line identified by B. Tube 26 is a multigrid amplifier tube biased so that it is normally blocked or non-conducting. When signals are applied to both the suppressor and signal grids at the same time the tube will conduct.

A portion of the output of the amplifier tube 7 is connected to a signal grid of an amplifier tube 25 through an attenuator network comprising resistors 25A and 25B and capacitor 25C. This tube serves to provide a signal to tube 26 of the correct polarity and magnitude. The output of the tube 25 is connected to the signal grid of the tube 26. It will be apparent therefore that tube 26 conducts when the signal from tube 7 coincides with the pulse output of the blocking oscillator tube 23.

The output of tube 26 is connected to a multivibrator circuit which in the form illustrated comprises a dual triode tube 27 together with the associated circuits. The duration of the square wave pulse of the multivibrator circuit of the tube 27 is controlled by the value of the resistor selected by the switch 28 for coarse adjustment and the variable resistor 29 for fine adjustment. The duration of the pulse is selected for a time which will be hereinafter explained in connection with the operation of the combination of circuits in accordance with this invention. The square wave output from the multivibrator circuit of tube 27 is differentiated by capacitor 32 in combination with the resistor 33 and passed by cathode follower tube 31 through the line identified by the letter D of Fig. 3*a* to a blocking oscillator tube 34 in Fig. 3*b*. The blocking oscillator tube 34 again is illustrated as a twin triode but any tube connected as a blocking oscillator will serve the purpose. The output of the blocking oscillator tube 34 is connected to a sweep circuit for a cathode ray oscillograph in any way known to those skilled in the art. These sweep circuits are shown in block diagram form only and the connection may be through any auxiliary circuits desired.

Figure 1:
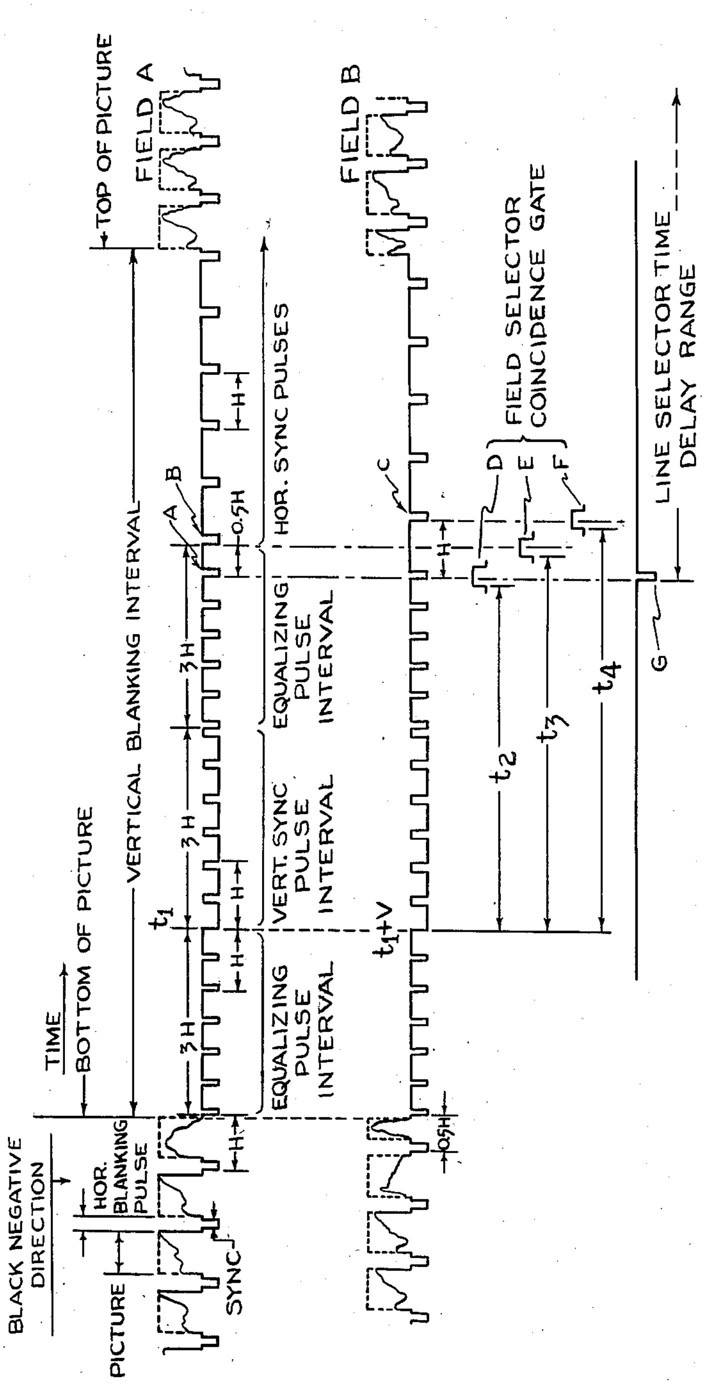
Fig. 1 shows sections of the standard video signal at the vertical synchronizing pulse interval for both odd and even interlace, as well as the time relation with respect to this signal of the field selector coincidence gate and the line selector delay to be hereinafter described.
Figure 2:
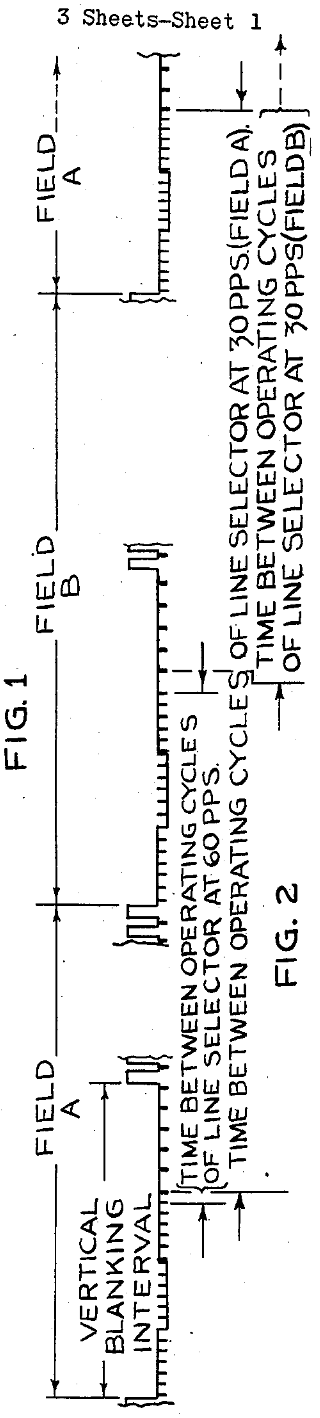
Fig. 2 shows in condensed form two fields of the composite video signal illustrating certain functions of the device with respect to time.

The operation of the circuit is as follows:

The composite television signal of the form shown in Fig. 1 is applied to the grid of tube 1, which is both plate and cathode loaded by resistors 2 and 3 so that by means of sliding contact 4 on resistor 5, the output may be selected both as to magnitude and polarity before being amplified by tube 6. The video portion of the signal is then clipped off in the grid circuit of tube 7 and the resulting composite sync is amplified in its plate circuit. Tube 8 further amplifies the composite sync and applies it at positive polarity to the integrating circuit consisting of resistors 9 and 10 and condensers 11 and 12. The integrated vertical sync signal is then amplified and clipped by tubes 13 and 14 and differentiated by condenser 15 and resistor 16. Tube 17 is a biased cathode follower which allows only the positive polarity of the differentiated signal to pass on to tube 18. Tube 18 and associated components constitute an electronic delay circuit utilizing a multivibrator type of circuit which is initiated into one cycle of operation by the positive pulse at the cathode of tube 17. This pulse corresponds approximately to the beginning of the serrated vertical sync signal, namely, $t_1$ or $(t_1+V)$, of Fig. 1 appearing at the grid of tube 8.

The duration of the cycle of operation of tube 18 is controllable over an interval of from approximately 280 to 470 microseconds by means of resistor 19. The signal at the plate 20 is differentiated by condenser 21 and resistor 22 and the positive polarity pulse, corresponding to the trailing edge, resulting from this process causes tube 23, a blocking oscillator, to operate over one complete cycle. The resulting positive polarity wave form appearing on lead B constitutes a gating signal controlling the operation of tube 26 and is equal in duration to slightly less than one-half the period between horizontal sync pulses as shown in Fig. 1, by reference characters D, E and F, at a time coincident with pulses A, B or C, depending on the setting of resistor 19.

This gating signal, together with the composite sync from the plate of tube 7, inserted by tube 25, is applied to the elements of tube 26 in such a way that this tube conducts plate current and is in a condition to amplify only when the gating signal on lead B is present on its suppressor grid. Thus the output of this stage is an amplified and inverted version of the pulse A, B or C occurring at the corresponding repetition rate.

The gating signals D, E and F of Fig. 1 are set with respect to $t_1$ or $t_1+V$ by adjusting the delay setting of the field selector control 19 as indicated at $t_2$ to produce 60 pulses per second gating signals to initiate the line selector successively for each field, $t_3$ to produce 30 pulses per second gating signals to initiate the line selector for each occurrence of field A and $t_4$ to produce 30 pulses per second gating signals to initiate the line selector for each occurrence of field B. It may be noted that a pulse is coincident with the field selector gate 60 times per second for $t_2$ and only 30 times per second for $t_3$ and $t_4$.

The output of tube 26, pulse G of Fig. 1, is coupled to one of the plates of tube 27, a twin triode connected in a multivibrator type delay circuit whose operation through a complete cycle of operation is controlled by the combination of switch 28 and its associated resistors, and variable resistor 29. The resistors selected by switch 28 are of such values that together with resistor 29 and condenser 30 form a variable time constant increasing by approximately equal intervals from a minimum value of approximately 6H from $t_1+t_2$ (or $t_3$ or $t_4$) or $(t_1+V)+t_2$ (or $t_3$ or $t_4$) to slightly more than V where H is equal to the interval between two horizontal sync pulses and V is the interval between two vertical sync intervals according to Fig. 1. The end of the delay interval of this circuit is then marked by a positive pulse of the differentiated wave form appearing at the cathode of tube 31 and is determined by the position of switch 28 and the value of resistor 29. This positive pulse is obtained by differentiation through condenser 32 in combination with resistor 33 which is of sufficiently short time constant and is used to trigger the blocking oscillator formed by tube 34 and transformer 35.

The operation of the circuit associated with tubes 27 and 31 is stabilized by inserting a suitable fraction of the composite sync signal at the proper point. In this specific embodiment this is done by inserting this signal with negative polarity at the control grid 38 of tube 27 through the attenuator circuit consisting of resistor 39, condenser 40, and resistor 41 and condenser 42. This system causes the termination of the operating cycle of this circuit to occur sharply in coincidence with a pulse of the composite sync wave form.

The blocking oscillator 34 operates for only one cycle and serves as a trigger amplifier. The output trigger obtained at the junction of resistor 36 and condenser 37 is then used to initiate the operation of the driven type sweep circuit for a cathode ray indicator through other auxiliary circuits as required.

The overall operation of these circuits provides a timing function to initiate a driven sweep on a cathode ray indicator with respect to any particular line in either field of the television raster and accomplishes this to within less than .02 microsecond.

The operation of this circuit is such that the displacement of the first horizontal pulse occurring at an interval of 6H from $t_1$ in Fig. 1 compared with the first horizontal sync pulse occurring after an interval of 6H from $t_1+V$, causing the interlacing of the two fields of the television raster, is utilized in this circuit to provide the selection of either field at a 30 cycles per second repetition rate or both fields alternately at a 60 cycles per second repetition rate and further it permits the selection of any particular horizontal sync pulse between two vertical synchronizing signals. The function of this circuit is thus to provide an output pulse corresponding to the start of any horizontal line in the television raster.

While the preferred embodiment has been illustrated and described, it will be apparent that modifications are possible without departing from the scope of the invention.

What is claimed is:

1. A device for providing triggering pulses for a cathode ray oscillograph sweep circuit from a composite television signal consisting of both video signals and synchronizing signals whereby the time base of said oscillograph may be actuated by said pulses in such a manner as to portray the individual video signals for any particular line chosen, said device comprising, in combination, a source of such television signals, clipping and amplifier stages connected to said source to remove the video portion of said composite signal, integrating means connected to said stages to integrate the serrated vertical synchronizing pulses of said synchronizing signals, amplifying means connected to said integrating means to amplify said integrated vertical synchronizing pulses, differentiating means connected to said amplifying means to differentiate said amplified vertical synchronizing pulses, a delay multivibrator, including a variable resistor, connected to said means and initiated into one cycle of operation by said integrated, amplified, and differentiated vertical synchronizing pulses, the duration of said cycle being variable by means of said variable resistor, a blocking oscillator connected to and initiated by a pulse from said multivibrator, a gated amplifier connected to and gated by said blocking oscillator to amplify horizontal synchronizing pulses derived from said clipping and amplifier stages, another delay multivibrator connected to and actuated by the output of said gated amplifier and stabilized by a portion of said composite signal also derived from said clipping and amplifier stages, said last mentioned delay multivibrator being adjustable over a wide range of delay, a differentiating circuit and a blocking oscillator connected thereto and acting as a trigger amplifier, the output of said last mentioned oscillator providing said triggering pulses for said cathode ray oscillograph.

2. The device of claim 1 in which said last mentioned delay multivibrator is adjustable by approximately equal steps from six times the interval between two horizontal synchronizing pulses to slightly more than the interval between two vertical synchronizing pulses.

3. The device of claim 1 in which the duration of the cycle of said first mentioned delay multivibrator is controllable over an interval of from approximately 280 to 470 microseconds.

4. Apparatus for selecting a television scanning line for analysis which comprises a cathode ray oscillograph, a selector circuit for selecting the phase of a television synchronizing pulse, a shaping circuit connected thereto, a pulse generator connected to said shaping circuit for generating a first set of square wave shaped pulses initiated by said shaped synchronizing pulse, a variable impedance element connected to said generator for varying in time the generation of said first set of pulses, a selector circuit for passing pulse energy when said first set of pulses coincide with said phase-selected television synchronizing pulse, a pulse producing circuit connected thereto and initiated by said pulse energy for producing a second set of pulses variable in time and providing triggering pulses for said cathode ray oscillograph.

5. Apparatus for selecting a television scanning line comprising pulse generating means initiated by synchronizing pulses for producing a first set of pulses variable in time, second pulse generating means controlled by said first set of pulses for producing a second set of pulses, gating means controlled by said synchronizing pulses for gating said second set of pulses, variable delay means actuated by said gated second set of pulses and stabilized by a portion of said synchronizing pulses, third pulse generating means actuated by the output of said variable delay means and a cathode ray tube sweep circuit actuated by said last mentioned additional pulse generating means.

RALPH P. ABBENHOUSE.

REFERENCES CITED

The following references are of record in the file of this patent:

UNITED STATES PATENTS

| Number | Name | Date |
|---|---|---|
| 2,258,943 | Bedford | Oct. 14, 1941 |
| 2,272,638 | Hardy | Feb. 10, 1942 |
| 2,277,000 | Bingley | Mar. 17, 1942 |
| 2,350,536 | Schlesinger | June 6, 1944 |
| 2,461,515 | Bronwell | Feb. 15, 1949 |
| 2,491,804 | Fleming | Dec. 20, 1949 |
| 2,511,146 | Beste | June 13, 1950 |